(12) United States Patent
Prinzivalli

(10) Patent No.: US 11,192,219 B2
(45) Date of Patent: Dec. 7, 2021

(54) HAND HELD MAGNETIC HOLDER

(71) Applicant: James Prinzivalli, Antioch, CA (US)

(72) Inventor: James Prinzivalli, Antioch, CA (US)

( * ) Notice: Subject to any disclaimer, the term of this patent is extended or adjusted under 35 U.S.C. 154(b) by 300 days.

(21) Appl. No.: 16/660,662

(22) Filed: Oct. 22, 2019

(65) Prior Publication Data

US 2021/0114175 A1 Apr. 22, 2021

(51) Int. Cl.
| | |
|---|---|
| B25B 11/00 | (2006.01) |
| A63H 17/26 | (2006.01) |
| F16M 11/04 | (2006.01) |
| A47F 7/00 | (2006.01) |
| F16B 1/00 | (2006.01) |
| F16M 13/04 | (2006.01) |
| B44D 3/00 | (2006.01) |

(52) U.S. Cl.
CPC ............ B25B 11/002 (2013.01); A47F 7/00 (2013.01); A63H 17/26 (2013.01); F16B 1/00 (2013.01); F16M 11/041 (2013.01); F16M 13/04 (2013.01); A47F 2007/0092 (2013.01); B44D 3/00 (2013.01); F16B 2001/0035 (2013.01)

(58) Field of Classification Search
CPC ....... B25B 11/002; A63H 17/26; A63H 33/26; F16M 11/041; F16M 13/04; F16B 1/00; A47F 7/00; B44D 3/00

USPC ........................................................ 294/65.5
See application file for complete search history.

(56) References Cited

U.S. PATENT DOCUMENTS

| | | | | |
|---|---|---|---|---|
| 3,550,936 A | * | 12/1970 | Puttick ................... | A63H 33/26 472/57 |
| 3,965,613 A | * | 6/1976 | Saunders ............... | A63H 17/26 446/132 |
| 4,233,777 A | * | 11/1980 | Inoue ..................... | A63H 11/04 40/426 |
| 5,188,555 A | * | 2/1993 | Zbegner ................. | A63H 33/26 273/443 |
| 9,773,601 B2 | | 9/2017 | Breiwa et al. | |
| 2004/0256529 A1 | * | 12/2004 | Richter ................. | F16B 47/006 248/309.1 |
| 2007/0145210 A1 | * | 6/2007 | Fawcett ................. | F16M 11/00 248/176.1 |
| 2008/0042020 A1 | * | 2/2008 | Laitila ................... | F16M 11/041 248/131 |
| 2010/0037442 A1 | * | 2/2010 | Branon ............... | B25B 27/0035 29/221.6 |
| 2015/0048237 A1 | * | 2/2015 | Vogel .................... | F16M 11/22 248/688 |
| 2017/0086314 A1 | * | 3/2017 | Simon .................... | F16M 11/40 |
| 2020/0046145 A1 | * | 2/2020 | Kemery .................... | A45F 5/00 |

* cited by examiner

Primary Examiner — Paul T Chin
(74) Attorney, Agent, or Firm — Thomas Schneck

(57) ABSTRACT

A magnetic holder for painting and displaying toy vehicles. An upright T-shaped member fits in a receiving cup affixed to a horizontal plate. The top of the T-shaped member has at least one outwardly facing magnet that latches a corresponding magnet in a toy vehicle.

4 Claims, 3 Drawing Sheets

HAND HELD MAGNETIC HOLDER

TECHNICAL FIELD

The invention relates to article supports and more particularly to a hand held magnetic holder for painting and displaying toy vehicles.

BACKGROUND ART

In the field of automotive painting, it is known that vehicles may be placed on a platform in a paint spray booth that can be raised and lowered so that the body of the vehicle is painted by an operator at levels that give convenient access to desired body locations directly in front of the painters. For example, European patent publication EP 1700817 shows an automotive raising and lowering system that moves an automobile to suitable working positions in a paint spray booth. In the painting of model cars essentially the same principle would allow model builders to paint models that are held stationary so that relative motion between a paint spray source and the vehicle can be carefully controlled.

In the field of magnetic article supporting devices cameras and similar electronic devices are sometimes supported on hand held magnetic posts. For example, in U.S. Pat. No. 9,773,601, G. Breiwa et al. teach use of a magnetic mounting system for small articles such as cell phones. An upright non-rigid post that can swivel to diverse orientations has a magnetic attaching feature that cooperates with another magnet on a cell phone.

An object of the invention was to devise a hand held support for painting and displaying toy vehicles having the convenience of full size automotive painting systems.

SUMMARY DISCLOSURE

The above object has been achieved with a magnetic hand held holder for automotive models with holders wherein an automotive body with wheels is supported using a T-shaped member. A model auto sits atop the T-shaped member and is magnetically fixed in place. The T-shaped member has a tubular base fitting into the palm of a human hand and a perpendicular top fastened to the base near the midpoint. The length or the top is longer than the model supported, the width being generally flat and narrower than a distance of wheel separation. A first magnet is affixed to the top of the T-shaped member facing away from the tubular base for latching onto a model having a second magnet attracted to the first magnet, with magnetic field strengths between the first and second magnets sufficient to latch the model to the top of the T-shaped member. The tubular base of the T-shaped member can fit into a cup shaped receptacle having a cross-sectional shape receiving the tubular base. The cup shaped member is mounted on a plate in a position allowing stable support of the T-shaped member with an automotive model magnetically supported thereon.

DETAILED DESCRIPTION

Figure 1:
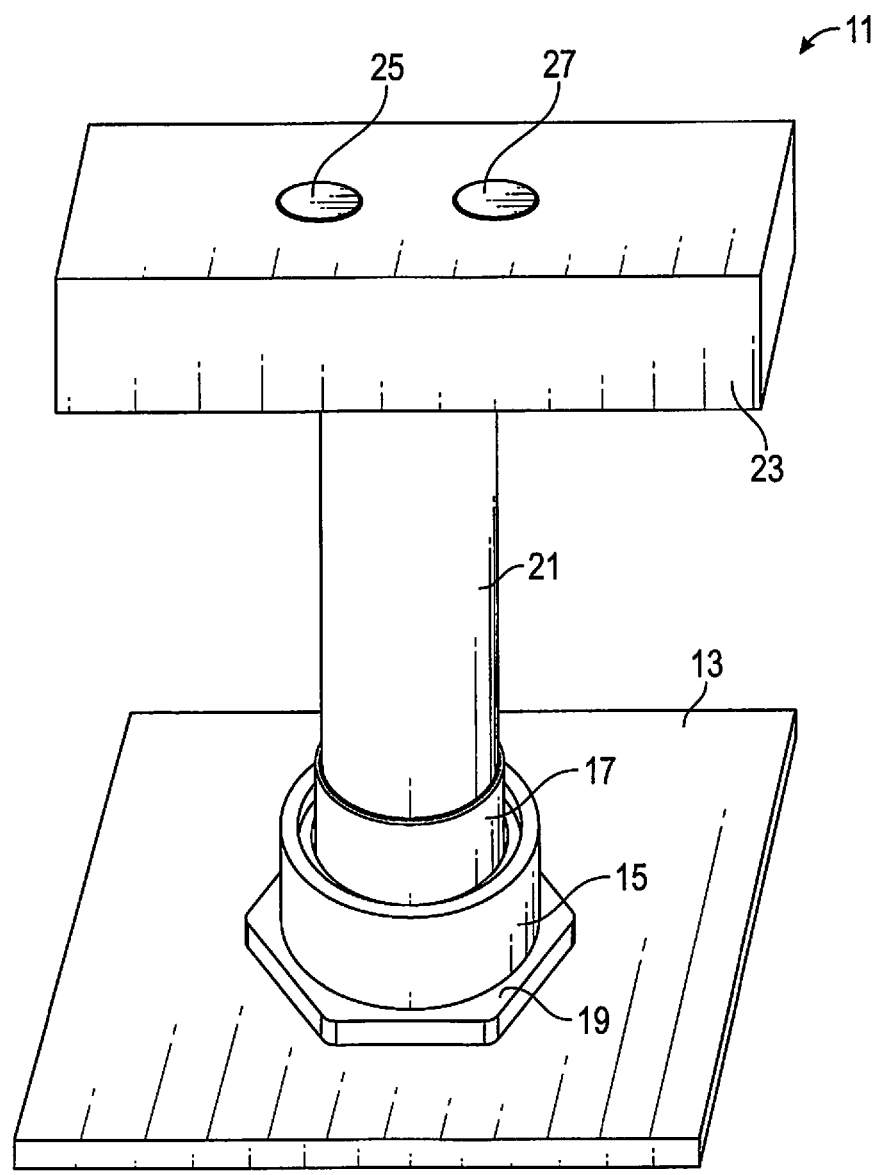
FIG. 1 is a perspective view of a magnetic hand held holder for painting model vehicles in accordance with the invention.

With reference to FIG. 1, a T-shaped member 11 is supported by upon a planar base 13 and a receptacle 15 that is joined to base 13 by a flange 19 at the bottom of the receptacle. There is no specific size for base 13 except that it support the T-shaped member 11 and models placed atop the member 11 without tipping. A typical size might be a square plate 5 to 8 inches on a side, although a square shape is not essential.

T-shaped member 11 has an upright handle 21 that is preferably tubular with a circumference that comfortably fits in the palm of a human hand and a length that extends through the palm, allowing the handle to be removably placed in a sleeve 17 that is an inner member of receptacle 15, which is cup shaped. The sleeve 17 has sufficient length to provide upright support to handle 21 in a coaxial manner. An elongated top piece 23 is joined to handle 21 at an end somewhere near its middle. Top piece 23 has a rectangular cross section with an upwardly facing flat top and has a length that approximates the length of a side of base 13 or about 5 to 8 inches long, which is longer than a class of models to be supported. The width of the top piece is narrower than a uniform distance of wheel separation of models supported on the top piece. The thickness of the top piece is greater than a fraction of a characteristic diameter of wheels of models that are supported. The overall height of the top piece 23 and the handle 21 is no taller than 12 inches, although this is an exemplary dimension. A typical overall height is 5 to 8 inches. Button magnets 25 and 27 are centered along the centerline of top piece 23 in a region over handle 21. Both bottom magnets have the same polarity pointing upwardly. As an alternative to button magnets, an elongated bar magnet could be embedded in top piece 23 with a single polarity, north or south, pointing upwardly.

Figure 2:
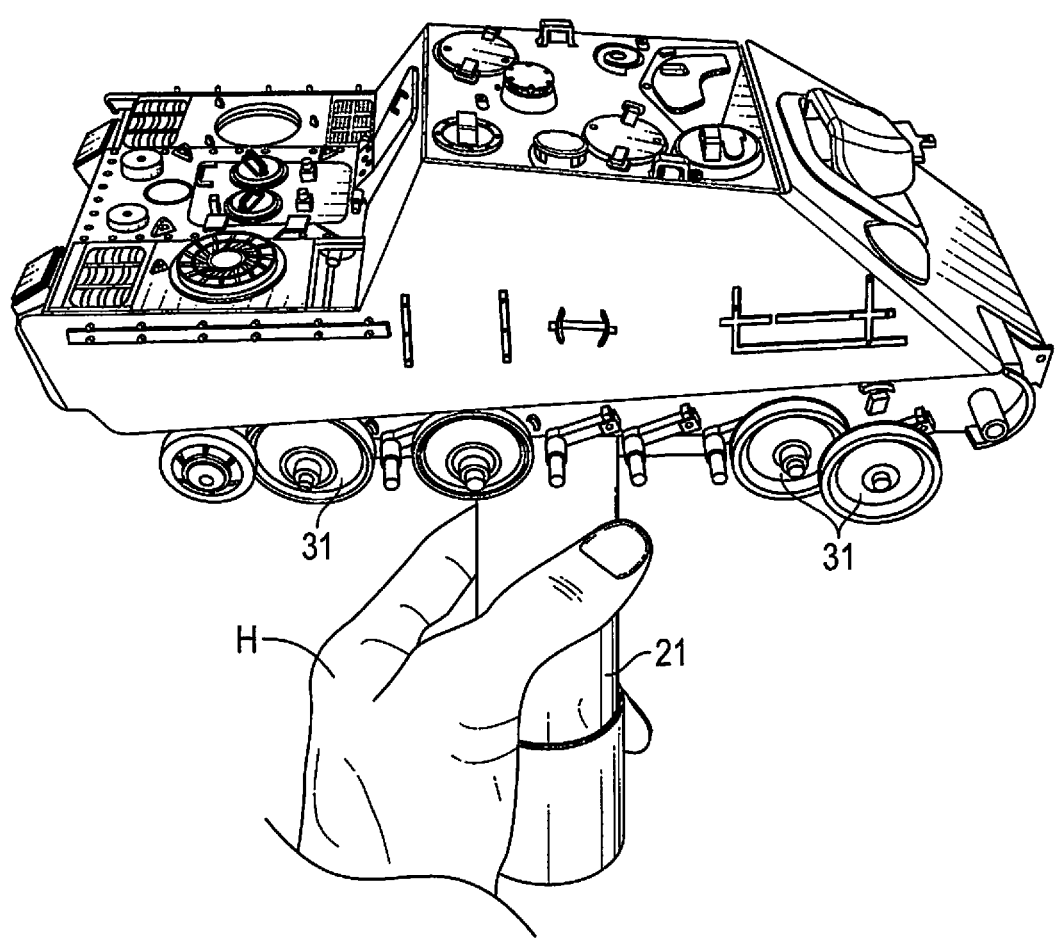
FIG. 2 is a perspective view of the apparatus of FIG. 1 with a model vehicle magnetically secured in place.

In FIG. 2 a model vehicle is placed atop the top piece, not shown in FIG. 2. The vehicle wheels 33 straddle the width of the top piece with the bottom of the vehicle resting on the upper side of top piece 23. A human hand, H, supports handle 21 that has been removed from its receptacle. By holding handle 21 the model vehicle can be moved to desired positions for painting without touching the vehicle.

Figure 3:
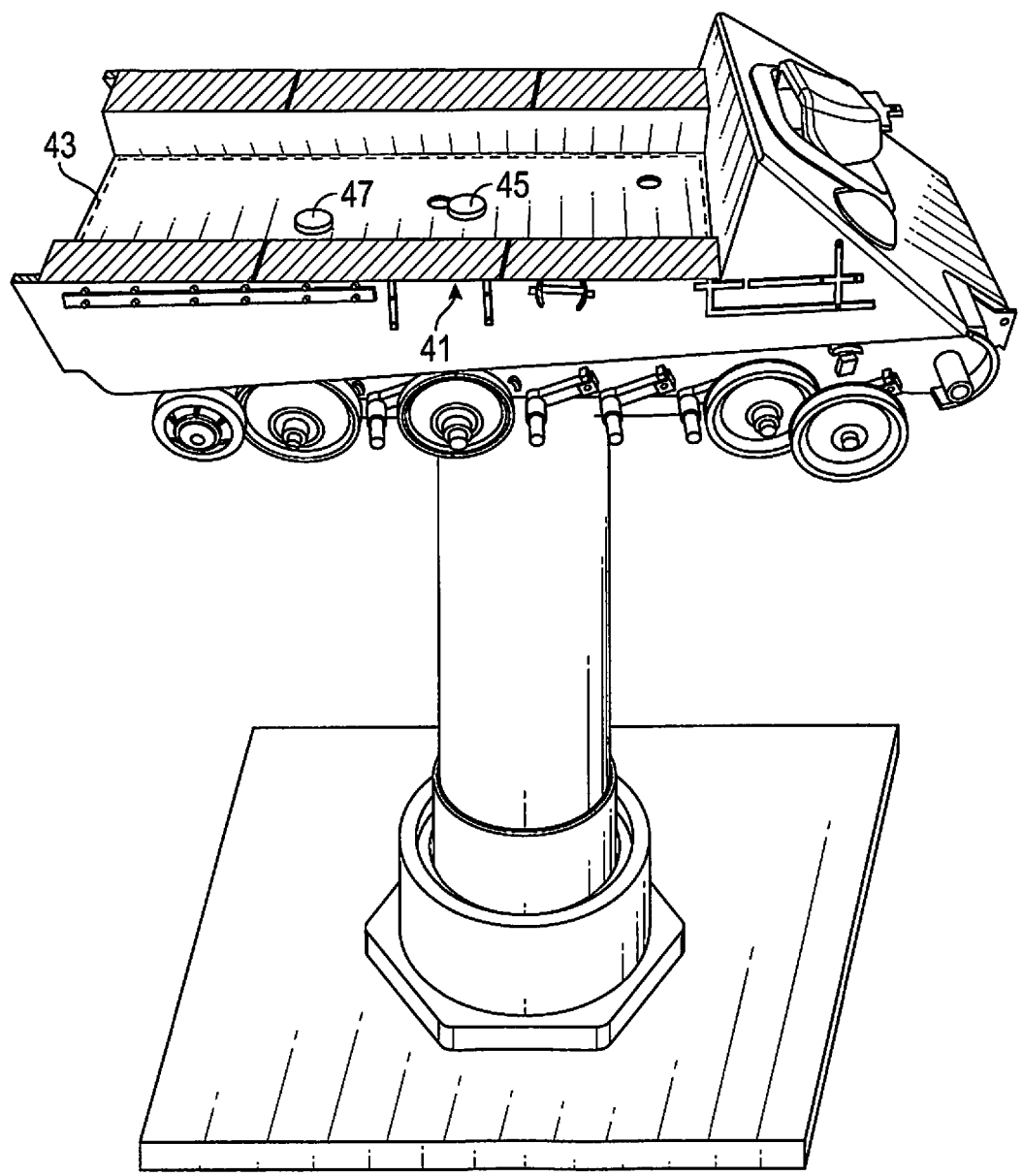
FIG. 3 is a perspective view of the lower portion of the model vehicle of FIG. 2 opened to show an example of cooperative magnet placement.

FIG. 3 shows a spaced apart pair of button magnets 45 and 47 affixed to the lower portion of a vehicle 41. The dashed line 43 indicates the position of top piece 23 that is below the vehicle. Magnets 45 and 47 have the same polarity facing downwardly for latching with magnets 25 and 27 embedded in the top piece 23 of T-shaped member 11 of FIG. 1.

What is claimed is:

1. A magnetic hand held holder for classes of automotive models each having a body supported by wheels of a characteristic diameter separated by a uniform distance comprising:

a T-shaped member with a tubular handle fitting into the palm of a human hand and a perpendicular top fastened to the handle near the midpoint having a length, width and thickness, the length being longer than a class of automotive models to be supported, the width being generally flat and narrower than a uniform distance of wheel separation, the thickness being greater than a fraction of a characteristic diameter of the wheels, and a first magnet affixed to the top facing away from the tubular handle;

a cup shaped receptacle having a cross-sectional shape receiving the tubular handle; and a plate mounting the cup shaped receptacle in a position allowing stable support of the T-shaped member with an automotive model magnetically supported thereon with a second magnet carried by the model in a magnetically engaging relationship with the first magnet.

2. The apparatus of claim 1 wherein the overall height of the T-shaped member is no greater than 12 inches overall.

3. The apparatus of claim 1 wherein at least two magnets are fixed to the top facing away from the tubular handle.

4. The apparatus of claim 1 wherein a toy vehicle is latched to the top of the T-shaped member by at least one magnet carried in the body of the toy vehicle.

* * * * *